United States Patent [19]

Bozhko et al.

[11] Patent Number: 4,796,867
[45] Date of Patent: Jan. 10, 1989

[54] APPARATUS FOR THERMAL DEBURRING OF PARTS

[75] Inventors: Valery P. Bozhko; Sergei V. Yatsenko; Vitaly E. Strizhenko; Alexei V. Losev; Viktor I. Pleshkov; Viktor M. Junash, all of Kharkov, U.S.S.R.

[73] Assignee: Kharkovsky Aviatsionny Institut, Kharkov, U.S.S.R.

[21] Appl. No.: 165,267

[22] PCT Filed: Apr. 30, 1986

[86] PCT No.: PCT/SU86/00037
§ 371 Date: Dec. 28, 1987
§ 102(e) Date: Dec. 28, 1987

[87] PCT Pub. No.: WO87/06510
PCT Pub. Date: Nov. 5, 1987

[51] Int. Cl.[4] ............ C21D 9/00; B23K 7/06
[52] U.S. Cl. ..................... 266/51; 266/261; 432/159; 432/197; 432/205

[58] Field of Search ........... 266/51, 48, 251, 261; 432/159, 197, 205

[56] References Cited

U.S. PATENT DOCUMENTS 3,475,229 10/1969 Geen et al. .................. 148/9
3,608,879 9/1971 Birr et al. .................... 266/51
4,413,814 11/1983 Lobastov .................... 266/251

FOREIGN PATENT DOCUMENTS 1170017 11/1969 United Kingdom .

Primary Examiner—Wayland Stallard
Attorney, Agent, or Firm—Lilling & Greenspan

[57] ABSTRACT

An apparatus for thermal deburring of parts has a working chamber (6) with a bottom member (3), an inlet valve (8), a spark plug (9) and an outlet valve. The latter is made in the form of a rod (10) having a through passage (11), one end of the passage communicating with the interior of the chamber (6) and the other end being disposed in a vessel (1) containing a liquid (2) and surrounded by an annular cooling chamber (13).

3 Claims, 2 Drawing Sheets

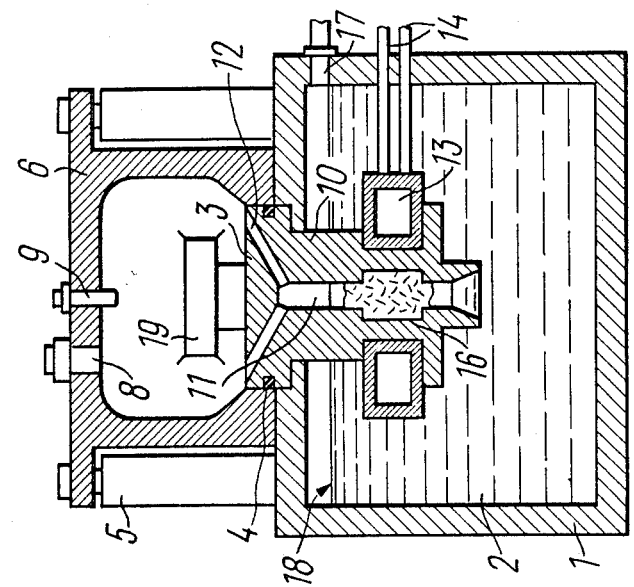
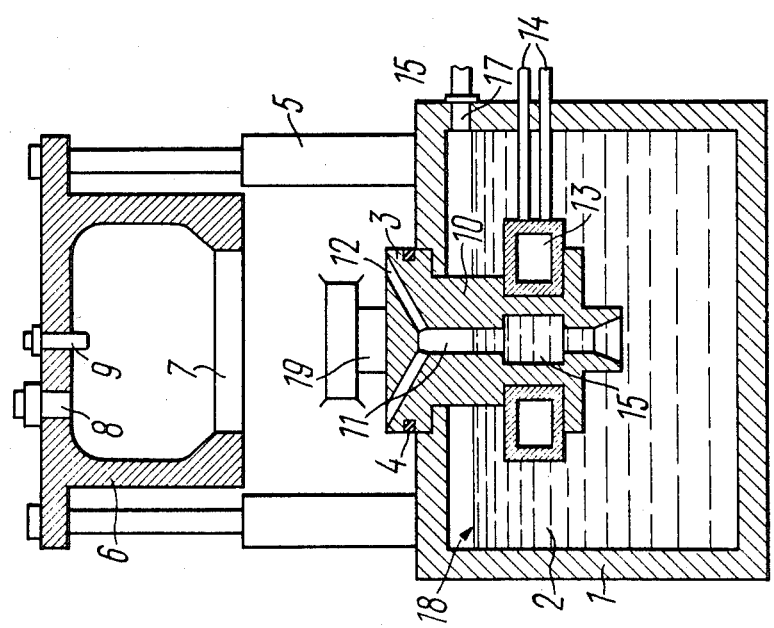

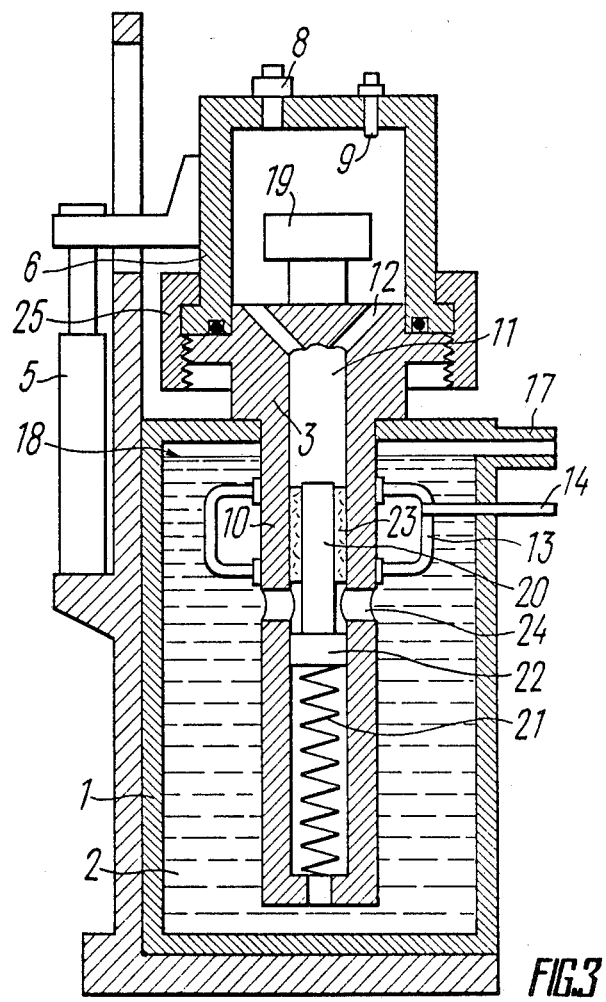

APPARATUS FOR THERMAL DEBURRING OF PARTS

TECHNICAL FIELD

The invention relates to the mechanical engineering, and in particular, it deals with apparatuses for thermal deburring of parts.

BACKGROUND OF THE INVENTION

Known in the art is an apparatus for thermal deburring of parts, comprising a working chamber and a worktable with bottom members for supporting parts, the bottom members alternatively sealing a charging opening in the working chamber. The working chamber communicates with oxident and fuel lines and is provided with a spark plug (cf. U.S. Pat. No. 3,666,252, U.S. Cl. 266-2, publ. 1972).

Combustion gases are discharged in this prior art apparatus after the treatment of parts through the charging opening of the working chamber after the bottom member has been lowered. The discharge of exhaust gases is only possible after they have been allowed to stay in the chamber, i.e. when their temperature has decreased owing to a heat removal from the chamber wall to a level which depends on the resistance of a flexible sealing ring mounted in the space between the bottom member and the chamber walls. The time of this exposure may range between 15 and 40 s so that the residence time of parts in the chamber also increases respectively. As a result, the deburring of parts is accompanied by an overheating of parts to temperatures which overpass the values specified for parts made of, e.g. titanium and aluminium casting alloys, plastics and rubber. In addition, it is difficult to treat parts having thin walls and fins because of eventual warping due to overheating. This limits the range of parts that can be treated as regards both the size and shape.

Also known in the art is an apparatus for thermal deburring of parts, comprising a working chamber and a bottom member for sealing the working chamber which are mounted for relative movement, an inlet valve for admission of a fuel gas mixture to the chamber, a spark plug and an outlet valve for discharging combustion products from the chamber (cf. USSR Inventor's Certificate No. 988499, Int. Cl. B 23K, publ. 1983). In this apparatus, the outlet valve is in the form of a widely used pair "valve/seat" wherein the sealing is ensured owing to an intimate contact at a collar by lapping the valve to the seat. In addition, the prior art apparatus is also provided with a thin-walled sleeve mounted in the chamber so as to define a space with the walls thereof, the sleeve ensuring a prolongation of service life of the apparatus because it prevents high temperature from acting directly upon the outlet valve.

When this prior art apparatus is used, combustion products are discharged from the chamber immediately after the working cycle is over when the outlet valve is actuated. It should be noted that while the provision of the protective sleeve allows the service life of the outlet valve to be somewhat prolonged, it is of a limited value because the valve should be repaired and worn members should be replaced.

It should also be noted that the design of the outlet valves is rather complicated and involves many parts and components; difficulty available materials are necessary for the manufacture of these valves, and auxiliary devices (electropneumatic valves, relays, and the like) are required for controlling the outlet valves.

SUMMARY OF THE INVENTION

The present invention is aimed at providing an apparatus for thermal deburring of parts having an outlet valve of such structure that would be resistant to the action of high temperatures and pressures, would be simple and would not involve any additional complicated systems.

The invention substantially resided in that an apparatus for thermal deburring of parts, comprising a working chamber and a bottom member for sealing the chamber which are mounted for a movement relative to each other, an inlet valve for admission of a fuel gas mixture to the chamber, a spark plug in the chamber, and an outlet valve for discharging combustion products from the chamber, according to the invention, is provided with a vessel containing water and an annular cooling chamber accommodated in the vessel, the outlet valve comprising a rod having a through passage having one end thereof communicating with the interior of the chamber and the other end disposed in the vessel containing water and surrounded by the annular cooling chamber.

The passage is preferably made with a cylindrical cavity concentrical with the cooling chamber.

In order to increase the speed of actuation of the valve, a cylindrical pin is preferably provided in the rod passage in the zone surrounded by the cooling chamber, the pin being mounted in a spaced relationship with the passage walls by means of an elastic member for axial movement in the passage.

The apparatus for thermal deburring of parts according to the invention features a long service life; it has an outlet valve which is designed to be simple in structure and resistant to the action of high temperature and pressure since the sealing member of the valve is in the form of an ice plug in the rod. The apparatus can be used for treating a wide range of parts as regards both the materials, size and shape since actuation of the outlet valve according to the invention, i.e. expulsion of the ice plug occurs in hundredths of a second.

The apparatus according to the invention does not call for an auxiliary devices for controlling the outlet valve.

BRIEF DESCRIPTION OF THE DRAWINGS

The invention will now be described with reference to specific embodiments illustrated in the accompanying drawings, in which:

FIG. 1 is a longitudinal sectional view of an apparatus for thermal deburring of parts with an outlet valve in the open position;

FIG. 2 is ditto of FIG. 1, with the closed outlet valve;

FIG. 3 shows an embodiment of an apparatus for thermal deburring of parts with the outlet valve in the closed position.

BEST MODE FOR CARRYING OUT THE INVENTION

An apparatus for thermal deburring of parts shown in FIGS. 1,2 comprises a vessel 1 containing a cooling liquid 2 and having a top wall in which is stationary incorporated a bottom member 3 in the form of a circular flange having an annular groove in which is mounted a flexible sealing ring 4. Hydraulic cylinders 5 connect a working chamber 6 to the same top wall, the chamber having a charging opening 7 of a size corresponding to the size of the bottom member 3, the working chamber being mounted for vertical movement relative to the bottom member 3. An inlet valve 8 for admission of a fuel gas mixture to the chamber 6 and a spark plug 9 are incorporated in the wall of the working chamber 6. The bottom member 3 is made integral with a rod 10 having one end thereof disposed in the vessel 1 containing the liquid 2 and a through passage 11. The passage communicates with the interior of the chamber 6 through inclined ports 12 made in the bottom member 3. An annular cooling chamber 13 having pipelines 14 for a coolant supply is mounted in the vessel 1 containing the liquid 2 concentrically with the rod 10. The through passage 11 has a cylindrical cavity 15 which is concentrical with the annular cooling chamber 13. The diameter of the cylindrical cavity 15 is greater than the diameter of the through passage 11. The rod 10 having the through passage 11 and the cavity 15 and disposed in the vessel 1 containing the liquid 2 so that it is surrounded by the cooling chamber 13 functions as an outlet valve designed for discharging combustion products from the working chamber 6.

FIG. 2 shows the same apparatus as that shown in FIG. 1, with the only difference that the outlet valve is closed, and an ice plug 16 is located in the cavity 15 and in a part of the through passage 11.

For discharging combustion products for the apparatus, a pipe 17 is provided in the vessel 1 which extends outside the vessel 1 above the level 18 of the liquid 2. Reference numeral 19 in FIG. 1 shows a part being treated supported by the bottom member 3.

In the embodiment of the apparatus for thermal deburring of parts shown in FIG. 3 the difference from the embodiment shown in FIGS. 1,2 resides in that a cylindrical pin 20 is mounted in the passage 11 of the rod 10 in the zone surrounded by the cooling chamber 13, the pin being mounted in the passage 11 by means of an elastic member for reciprocations axially within the passage 11. In this embodiment of the apparatus the elastic member is in the form of a cylindrical spring 21, the pin bearing against the spring by its base 22. Compressed air supplied to the space under the pin 20 may also function as an elastic member. The apparatus for thermal deburring of parts is shown in FIG. 3 in a position in which the outlet valve is closed, and an ice plug 23 is disposed in the space between the pin 20 and the passage walls. In this embodiment radial ports 24 are provided in the rod 10 for discharging combustion products from the passage into the vessel 1.

The embodiment of the apparatus for thermal deburring of parts shown in FIGS. 1,2 functions in the following manner. In the initial position, the piston rods of the hydraulic cylinders 5 (FIG. 1) are extended, and the working chamber 6 is raised above the bottom member 3 at a distance necessary for unloading and loading the parts 19. The working cycle begins with the installation of the part 19 to be treated on the end face of the bottom member 3. Then the hydraulic cylinders are actuated to retract the piston rods, and the working chamber 6 which is rigidly secured thereto, is lowered until it engages the bottom member 3 (FIG. 2). The force of the hydraulic cylinders is chosen in such a manner that it should overcome the force acting in the chamber 6 at maximum pressure of the burned mixture.

Sealing of the chamber 6 at the charging opening 7 is ensured by means of the flexible sealing ring 4. Then the cooling chamber 13 comes into play, and the liquid 2 such as water, which is available in the through passage 11 starts freezing in the zone of the cylindrical cavity 15 to form the ice plug 16 (FIG. 2). As the process of transformation of water to ice is accompanied by an increase in volume, the formation of the ice plug 16 is accompanied by generation of radial forces ensuring sealing of the passage 11. Dimensions and shape of the cylindrical cavity 15 are chosen in such a manner that the ice plug thus formed cannot be broken-up under the action of the initial pressure of fuel mixture in the working chamber 6 and do disintegrate under the action of combustion products.

The parameters of the cooling chamber 13 are chosen in such a manner as to ensure freezing of the volume of water in the cavity 15 during the time necessary for unloading and loading of the parts. This time is between 25 and 30 s in practical applications so as to have the capacity of at least two cycles per minute.

After the formation of the ice plug 16, a fuel mixture is fed through the inlet valve into the interior of the working chamber 6, and the fuel mixture is ignited by the spark plug 9. As a result of a rapid pressure and temperature increase, burs on the part 19 being treated are burned and/or fused owing to their relatively large surfase and low mass, and the gases thus formed act at high temperature and pressure through the passages 12 and 11 upon the ice plug 16 to disintegrate it, and the remnants of the ice are removed into the vessel 1 containing water. The gases pass through the water to be cooled there and escape into the interior of the vessel 1 and are discharged therefrom through the pipe 17. Water from the vessel 1 fills back the passage 11 and cavity 15 after the discharge of exhaust gases since the water level 18 in the vessel 1 is above the cavity 15.

After the gases have been discharged, the hydraulic cylinders 5 are actuated to extend the piston rods, and the working chamber 6 is raised (FIG. 1) for removing the treated part 19 and for placing the next part 19 on the bottom member 3. As the cooling chamber 13 is not switched off during operation of the apparatus, a new ice plug 16 will be formed in the cavity 15 during the time when the working chamber 6 is raised, parts are unloaded and loaded and the working chamber 6 is lowered, the new ice plug allowing the passage 11 to be sealed.

The working cycle is then repeated.

The embodiment of the apparatus shown in FIG. 3 functions in the following manner.

In the initial position the hydraulic cylinders 5 hold the working chamber 6 in the upper position. The parts to be treated are placed on the end face of the bottom member 3. In this period, the pin 20 is disposed in the zone surrounded by the cooling chamber 13 under the action of the spring 21. An annular ice plug 23 is formed in the space between the body of the pin 20 and the walls of the passage 11. Then the hydraulic cylinders 5 lower the working chamber 6 onto the bottom member 3. The ring 25 is rotated by means of a mechanism which is not shown in the drawing to lock a bayonet joint connecting the chamber 6 to the bottom member 3 in a sealing relationship with each other. Then a fuel mixture is admitted to the chamber 6 through the valve 8, and the mixture is ignited by the spark plug 9. The burning gases remove burs from the part 19 being treated in the chamber 6. The increased pressure of combustion products acts upon the end face of the pin 20 and upon the ice plug 23 to disintegrate the latter. The pin 20 is caused to move down under the action of the gas pressure. Water escapes from under the pin 20 into the vessel 1 through the port in the lower end of the passage 11 thereby damping the impact action on the part of the pin 20 upon the spring 21 which occurs upon a sudden pressure increase owing to an explosive character of burning of the fuel mixture in the chamber 6. Combustion products escape from the chamber 6 through the now free passage 11 and radial ports 24 into the vessel 1 wherein they pass through the liquid 2 and are removed after cooling through the pipe 17 into atmosphere. As the end face of the pin 20 is in the zone of intensive erosive action of the jet of combustion products, the surface layer of the end face is partly disintegrated. This would not, however, hamper its normal operation as the filler of the exhaust valve in which the sealing member is in the form of an ice interstice formed during every cycle irrespective of quality of the end face of the pin 20. After the discharge of combustion products, the ring 25 is rotated, the chamber 6 is raised to release the bottom member 3 for the removal of parts and for installation of new parts to be treated.

This embodiment of the apparatus features a faster operation as compared with the apparatus shown in FIGS. 1, 2 owing to a reduced time necessary for the formation of the ice plug 23 because of a smaller volume of liquid being frozen.

The dimensions of the pin 20 and diameter of the axial passage 11 are chosen in such a manner as to obtain parameters of the ice plug 23 meeting the requirements of the production process of high-quality deburring of parts.

Therefore, the apparatus according to the invention makes use of an ice plug formed in the exhaust port after every working cycle, the plug functioning as the outlet valve.

Wear of the surface of the exhaust passage 11 is automatically compensated for during freezing of a next batch of water admitted from the vessel 1. This facility allows the structure of the apparatus to be substantially simplified and service life to be prolonged by 8 to 10 times.

As the ice plug disintegrates under the action of hot gases under high pressure during hundredths of a second, the exhaust time is substantially reduced so that the time during which hot gases would act upon the parts being treated is also reduced. This makes it possible to enlarge the range of parts that can be treated and avoid rejection of parts due to overheating.

Industrial Applicability

The present invention can be employed in mechanical-engineering buildings for cleaning of metal and plastic parts.

We claim:

1. An apparatus for thermal deburring of parts comprising a working chamber (6) and a bottom member (3) for sealing the chamber (6) which are mounted for a movement relative to each other, an inlet valve (8) for admission of a fuel gas mixture to the chamber (6), a spark plug (9) in the chamber (6) and an outlet valve for discharging combustion products from the chamber (6), characterized in that it is provided with a vessel (1) containing a liquid (2) and an annular cooling chamber (13) accommodated in the vessel (1), the outlet valve comprising a rod (10) having a through passage (11) having one end thereof communicating with the interior of the chamber (6) and the other end disposed in the vessel (1) containing liquid (2) and surrounded by the annular cooling chamber (13).

2. An apparatus for thermal deburring of parts according to claim 1, characterized in that the through passage (11) has a cylindrical cavity (15) disposed concentrically with the cooling chamber (13).

3. An apparatus for thermal deburring of parts according to claim 1, characterized in that a cylindrical pin (20) is disposed in the passage (11) of the rod (10) in the zone surrounded by the cooling chamber (13) in a spaced relationship with the walls of the passage (11), said pin (20) is mounted by means of an elastic member for an axial movement within the passage (11).

* * * * *